Patented Feb. 9, 1926.

1,572,512

UNITED STATES PATENT OFFICE.

RAYMOND C. BENNER, OF BAYSIDE, NEW YORK, ASSIGNOR TO THE PREST-O-LITE COMPANY, INC., OF NEW YORK, N. Y., A CORPORATION OF NEW YORK.

COMPOSITION FOR STORAGE-BATTERY POSITIVE ELECTRODES AND PROCESS OF MAKING SAME.

No Drawing. Application filed November 6, 1923. Serial No. 673,206.

*To all whom it may concern:*

Be it known that I, RAYMOND C. BENNER, a citizen of the United States, residing at Bayside, in the county of Queens and State of New York, have invented certain new and useful Improvements in Compositions for Storage-Battery Positive Electrodes and Processes of Making the Same, of which the following is a specification.

This invention relates to improvements in the manufacture of positive electrodes for storage batteries of the lead-sulfuric acid type. An important object is the substantially exact regulation of the lead sulfate content of active material compositions for such electrodes. Variation in the amount of sulfate is avoided by using a solution of an alkali, instead of the sulfate-forming solutions heretofore employed, in making up the compositions for application to the supporting electrode structure. The invention is particularly applicable in making positives which are partially or wholly "preformed", that is, capable of generating current under proper conditions without the customary electrolytic charging.

It is well understood that the characteristics of storage battery positives are dependent to a considerable extent upon the amount of lead sulfate in the active material applied to them. The density of the sulfate is materially lower than that of lead peroxid or metallic lead, and there is accordingly a reduction of volume when the electrolytic forming takes place, with consequent production of pores throughout the mass of formed active material. The advantages of the sulfate are, however, dependent on discriminating use. Too little sulfate will result in a high density electrode, likely to buckle or warp when sulfated; too much will make the electrode unduly porous and relatively non-coherent. High density results in low capacity, and non-coherence in rapid deterioration.

Numerous processes have been suggested for producing a desired predetermined quantity of the sulfate. Such processes ordinarily involve the formation of the sulfate in situ, as by using sulfuric acid or other sulfating solution in preparing the paste, so that the bonding effect of the sulfate crystals may be utilized. It is impractical to obtain a sufficiently exact regulation of the sulfate content by proceeding in this way. The extent of reaction is dependent upon too many factors difficult to control. It is only exceptionally that two batches of lead oxide have identical physical and chemical characteristics. Also, atmospheric temperature, the concentration and temperature of the sulfating solution, the time of reaction, and other variant factors may have a marked effect on the quantity of sulfate formed.

I have discovered that compositions containing lead peroxid and lead sulfate, with or without lower lead oxids or other ingredients, react with alkali solutions to form crystalline compounds which serve admirably as bonding means. Apparently basic sulfates of lead are the principal bonding compounds formed, but there may be others which have a material effect.

It will be understood that the sulfate content of the composition at the time of application to the grid is the principal factor affecting porosity. This quantity of sulfate largely determines the density of the composition, considering pastes of proper plasticity for application to the grids, and hence the amount of combined lead which can be applied to unit grid area under the pressure selected for pasting. The sulfate content is neither increased nor diminished by the treatment with alkali, nor are the compounds formed materially different from lead sulfate in density. Hence there is no substantial change in the lead content of unit weight of the composition.

The lead sulfate may be added in solid state to the peroxid, or a mixture of electrolytic sulfate and peroxid may be used. In the application Serial No. 650,728 filed on July 10, 1923, by R. C. Benner and J. H. Fink, the regulation of the electrolysis to produce desired proportions of peroxid and sulfate is described. According to that application the sulfate may be present in amounts of from about 5% to about 45%. A composition desirable for general use contains about 85% $PbO_2$, 10% $PbSO_4$ and 5% PbO. If the lead peroxid composition is not to be used at once, it should be washed to remove free sulfuric acid. In the absence of such acid the composition may be kept indefinitely in the air without change.

Typical compositions prepared by the method just referred to are listed below:

| | | | |
|---|---|---|---|
| Litharge (PbO) | 0.91 | 1.85 | 0.72 |
| Red lead ($Pb_3O_4$) | 3.54 | 6.39 | 4.81 |
| Lead sulphate ($PbSO_4$) | 47.14 | 24.36 | 9.28 |
| Lead peroxide ($PbO_2$) | 47.34 | 66.17 | 83.62 |

Any other suitable lead sulfate-containing composition may be used. The present invention is not primarily concerned with the compositions as such, but in the method of retaining the sulfate content unchanged.

Alkali metal hydroxids or ammonium hydroxid may be used in the making up of the paste. A 20% solution of sodium hydroxid gives good results, but this concentration may be varied according to conditions. The paste may be applied to the grids by hand or mechanically. If particularly coherent plates are desired, the hand pasting may be followed by mechanical application of pressure to densify the composition. The paste does not set while kept in moist condition, but hardens well when allowed to dry. The pasted plates may be baked at around 65° C., for example, or may be allowed to dry at atmospheric temperature. They are then ready for assembly in the battery, and will produce current without preliminary charge when assembled with suitable electrolyte and negative electrodes.

The bonding action of the basic compounds formed is equivalent to that produced by the high pressures which have sometimes been used heretofore to insure coherence. Such pressures involve manufacturing difficulties and are likely to result in breakage of a certain proportion of the grids. A valuable feature of this invention is the avoidance of high pressure pasting.

The electrodes may be either used without initial forming charge, or given a charge, depending on the proportion of peroxid and other conditions. Charging, if required at all, will be of much shorter duration than the ordinary electrolytic forming of positive plates. The advantages of preformed positive electrodes, of the general type described herein, are set forth in detail in application Serial No. 650,728, referred to above.

Lead sulfate suitable for use as an initial ingredient of active material compositions may be economically prepared electrolytically or made in other ways, or other compounds of lead which are more bulky than the peroxid and introduce no objectionable ingredient into the battery, may also be used.

Durable and efficient positive electrodes of definite sulfate content may be readily prepared by the method of the present invention. Various modifications of this method may be made within the scope of the appended claims.

I claim:

1. Process of preparing active material compositions for positive electrodes, comprising treating a mixture containing lead peroxid and a lead compound having a density less than the peroxid, with a solution of an alkali, whereby bonding compounds are formed in the mixture.

2. Process of making positive electrodes for storage batteries, comprising treating a mixture containing lead peroxid and a lead compound having a density less than the peroxid, with a solution of an alkali, and applying the mixture to a support.

3. Process according to claim 2, in which the mixture is applied to the support by hand.

4. Process according to claim 2, in which the support pasted with the mixture is baked to dry and harden the mixture.

5. An active material composition for positive storage battery electrodes, comprising lead peroxid, a lead compound having a density less than the peroxid, and a solution of an alkali.

6. An active material composition for positive storage battery electrodes, comprising lead peroxid, lead sulfate, and a solution of an alkali.

7. The invention according to claim 6, in which an aqueous solution of sodium hydroxid of about 20% strength is present.

8. An active material composition for positive storage battery electrodes, comprising lead peroxid, a lead compound having a density less than the peroxid, and products resulting from the reaction of such materials with a solution of an alkali.

9. A positive electrode for storage batteries, comprising a support and a composition thereon containing lead peroxid, a lead compound having a density less than the peroxid, and basic compounds bonding the composition.

In testimony whereof, I affix my signature.

RAYMOND C. BENNER.